(12) United States Patent
Huynh et al.

(10) Patent No.: US 10,235,133 B2
(45) Date of Patent: Mar. 19, 2019

(54) TOOLTIP SURFACING WITH A SCREEN READER

(71) Applicant: FACEBOOK, INC., Menlo Park, CA (US)

(72) Inventors: Cynthia Huynh, Fremont, CA (US); Brett Alden Lavalla, San Carlos, CA (US); Georgiy Kassabli, London (GB); Matthew Charles King, Mountain View, CA (US)

(73) Assignee: FACEBOOK, INC., Menlo Park, CA (US)

( * ) Notice: Subject to any disclaimer, the term of this patent is extended or adjusted under 35 U.S.C. 154(b) by 91 days.

(21) Appl. No.: 15/472,085

(22) Filed: Mar. 28, 2017

(65) Prior Publication Data

US 2018/0285063 A1    Oct. 4, 2018

(51) Int. Cl.
*G06F 3/0481* (2013.01)
*G06F 3/16* (2006.01)
*G06F 9/451* (2018.01)

(52) U.S. Cl.
CPC ............ *G06F 3/167* (2013.01); *G06F 3/0481* (2013.01); *G06F 9/451* (2018.02)

(58) Field of Classification Search
CPC ... G06F 3/0481; G06F 3/04812; G09B 21/00; G09B 21/001; G09B 21/006
See application file for complete search history.

(56) References Cited

U.S. PATENT DOCUMENTS

| 2011/0314414 A1* | 12/2011 | Stringer | G06F 3/0481 715/785 |
| 2014/0058733 A1* | 2/2014 | Voorhees | G09B 21/005 704/260 |

* cited by examiner

*Primary Examiner* — Haoshian Shih
(74) *Attorney, Agent, or Firm* — Morgan, Lewis & Bockius LLP (57) ABSTRACT

A user device configures an informational message associated with a first user-interface element of a plurality of user-interface elements on a screen displayed by the user device to be read aloud by a screen reader upon display of the screen. Furthermore, the user device configures the first user-interface element to be read aloud by the screen reader in response to a user input to transition the screen reader from the informational message to the first user-interface element.

19 Claims, 6 Drawing Sheets

TOOLTIP SURFACING WITH A SCREEN READER

TECHNICAL FIELD

The disclosed implementations relate generally to the accommodation of webpage or application tooltips in a computer using screen-reading technology.

BACKGROUND

Most people generally interact with computers through the use of a keyboard, mouse, and/or touch-sensitive display screen to input information into the computer and through a display screen to receive information from the computer. However, people with blindness or severe sight impairment are often unable to use a display screen to interact with a computer. Accordingly, many such people rely on assistive-technology programs such as screen readers to receive information from computer systems.

A screen-reading assistive-technology program typically reads the content on a screen aloud, so that it can be heard by a person who is unable to view the screen. Such programs are not limited to use by sight-impaired people, but the majority of users of screen-reading programs may have some level of sight impairment. Multiple screen-reading programs are presently available, including but not limited to Job Access With Speech ("JAWS") from Freedom Scientific, Window-Eyes from GW Micro, Dolphin Supernova by Dolphin Computer Access, and open-source products such as NonVisual Desktop Access ("NVDA"), for example.

When using web-based services, such as a social media platform, a computer user typically accesses these services through a web browser, such as Microsoft's Edge or Internet Explorer, Google's Chrome, Apple's Safari, or Mozilla's Firefox. This process is known in the art and generally involves having a web-based service send content over a network to the browser, which displays the content. The browser then sends back text, clicks, and other user-provided content, allowing the user to interact with the service.

Meanwhile, a native software application ("app") on a user device—for example, a social media "app" running on a smart phone, tablet, or other device—may typically execute instructions on the user device, including instructions for displaying screens, but may also access services and content provided by a server over a network.

To allow sight-impaired users access to web-based services, many screen-reading programs work with one or more web browsers to read the content sent by the web service. Furthermore, to allow sight-impaired users access to applications installed on a user's device, many screen-reading programs work with the applications to read the content they display.

While screen readers have become more advanced and are capable of parsing complex web pages and displays of native applications, these programs are often incapable of determining which parts of a web page or application display should be read first, and which parts maybe skipped entirely.

For example, so-termed "tooltips" are included in many web pages and native applications. A tooltip is a user-interface element that may provide information about an element displayed on a screen. Tooltips may take the form of a graphical object, such as a box, and appear when a user hovers over the corresponding element, e.g., by using a mouse cursor or other pointer. Usage of tooltips is especially prevalent on web pages, where many graphical web browsers are configured to display the title attribute of a hypertext markup language (HTML) element as a tooltip when the user hovers the pointer over the element.

While tooltips are intended to enhance the use of a web page or application, they may cause problems with many screen reader technologies. For example, a screen-reading program designed to work with one or more web browsers may be programmed to navigate a web page from the top left to the bottom right. But due to the way tooltips are provided in a web page (e.g., using the title or alt attributes of an HTML element, or otherwise being located at a very top or bottom of a web page), tooltips may cause the screen reader to navigate immediately to the tooltip and read it, rather than following the logical order of the web page. This may cause confusion for the visually-impaired user and result in a disorienting screen-reading experience. Furthermore, once the tooltip is dismissed by the user, the screen reader may proceed to read aloud the content that follows the tooltip's location on the page, rather than proceeding from the top of the page. Similar problems may exist for native applications running on the user device, where the time of reading of a tooltip may depend highly on visual factors, such as how big the tooltip is, the direction it is pointing, etc. In an application, even if the screen reader reads the tooltip at a time close to its corresponding element, this may not be satisfactory for a visually-impaired user, who may remain confused because the tooltip is read after the element, or other content is read in between reading the tooltip and the element, etc.

The issues with tooltips for screen readers creates difficulties for both web-based content and native applications, whose designers may wish to use tooltips to enhance the user experience, but do not want to prevent visually-impaired users from being able to adequately access their content.

SUMMARY

Accordingly, there is a need to handle tooltips in web content and native application content in a manner that will prevent confusion to a visually-impaired user employing a screen reader to read aloud the content.

In accordance with some embodiments, a method is performed at a user device (e.g., client device) with one or more processors and memory storing instructions for execution by the one or more processors. The method includes configuring an informational message associated with a first user-interface element of a plurality of user-interface elements on a screen displayed by the user device to be read aloud by a screen reader upon display of the screen. The method further includes configuring the first user-interface element to be read aloud by the screen reader in response to a user input to transition the screen reader from the informational message to the first user-interface element.

In accordance with some embodiments, a non-transitory computer-readable storage medium stores one or more programs for execution by one or more processors of a user device. The one or more programs include instructions for performing the above method. In accordance with some embodiments, a user device includes one or more processors and memory storing on or more programs for execution by the one or more processors. The one or more programs include instructions for performing the above method.

Thus, users of screen-reading programs are read aloud the tooltips at times commensurate with their corresponding elements and in a manner that prevents confusion for the user.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings and specification.

DETAILED DESCRIPTION

Reference will now be made to implementations, examples of which are illustrated in the accompanying drawings. In the following description, numerous specific details are set forth in order to provide an understanding of the various described implementations. However, it will be apparent to one of ordinary skill in the art that the various described implementations may be practiced without these specific details. In other instances, well-known methods, procedures, components, circuits, and networks have not been described in detail so as not to obscure aspects of the implementations unnecessarily.

It will also be understood that, although the terms first, second, etc. are, in some instances, used herein to describe various elements, these elements should not be limited by these terms. These terms are used only to distinguish one element from another.

The terminology used in the description of the various implementations described herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
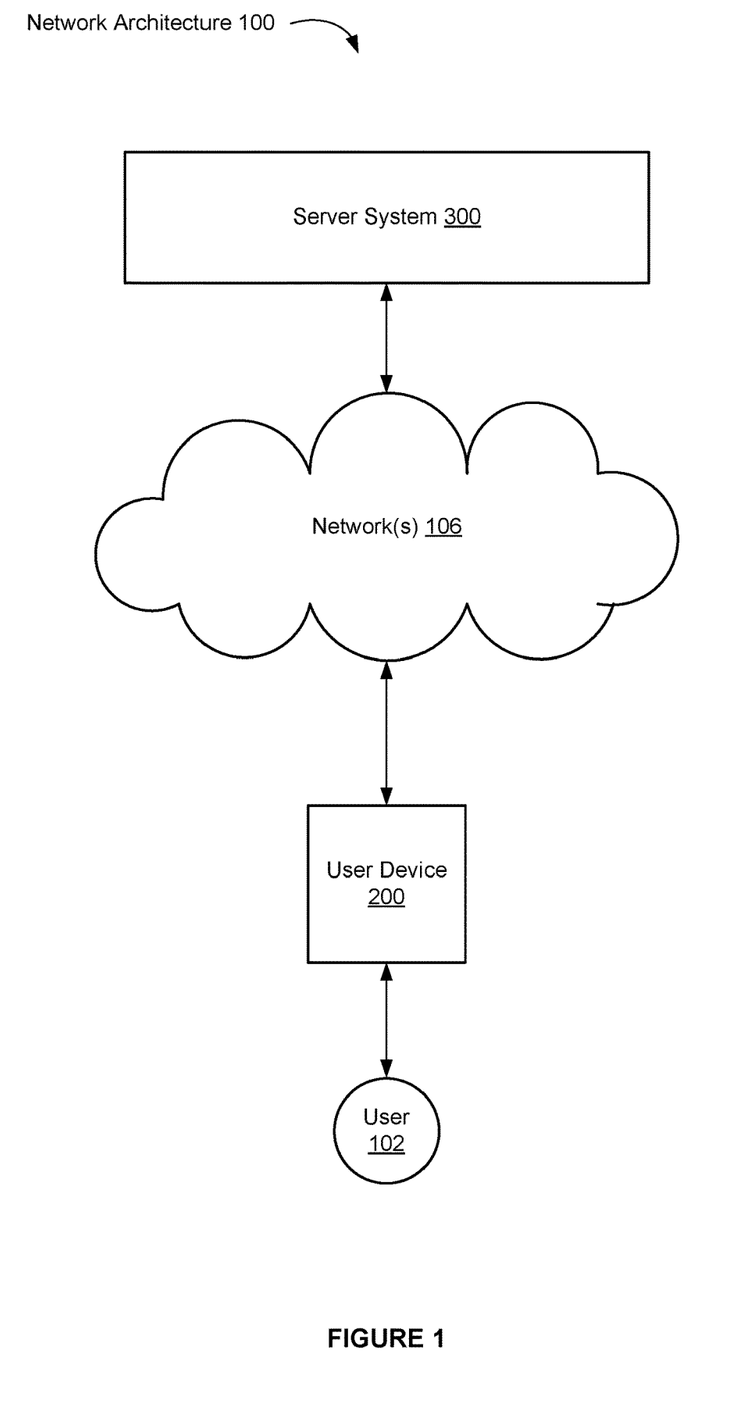
FIG. 1 is a block diagram illustrating an example network architecture in accordance with some embodiments.

FIG. 1 is a block diagram illustrating an example network architecture 100 in accordance with some embodiments. The network architecture 100 includes a user device 200 and one or more server systems 300. One or more networks 106 communicably connect each component of the network architecture 100 with other components of the network architecture 100. In some implementations, the one or more networks 106 include public communication networks, private communication networks, or a combination of both public and private communication networks. For example, the one or more networks 106 can be any network (or combination of networks) such as the Internet, other wide area networks (WAN), local area networks (LAN), virtual private networks (VPN), metropolitan area networks (MAN), peer-to-peer networks, and/or ad-hoc connections.

A user device 200 is associated with one or more users 102. In some implementations, a user device 200 is a personal computer, a mobile electronic device, a wearable computing device, a laptop computer, a tablet computer, a mobile phone, a feature phone, a smart phone, a digital media player, or any other device capable of capturing and/or transmitting data. In some implementations, user device 200 includes input devices 208 for receiving user inputs (e.g., a keyboard 242, mouse 244, or trackpad 245, FIG. 2).

Figure 2:
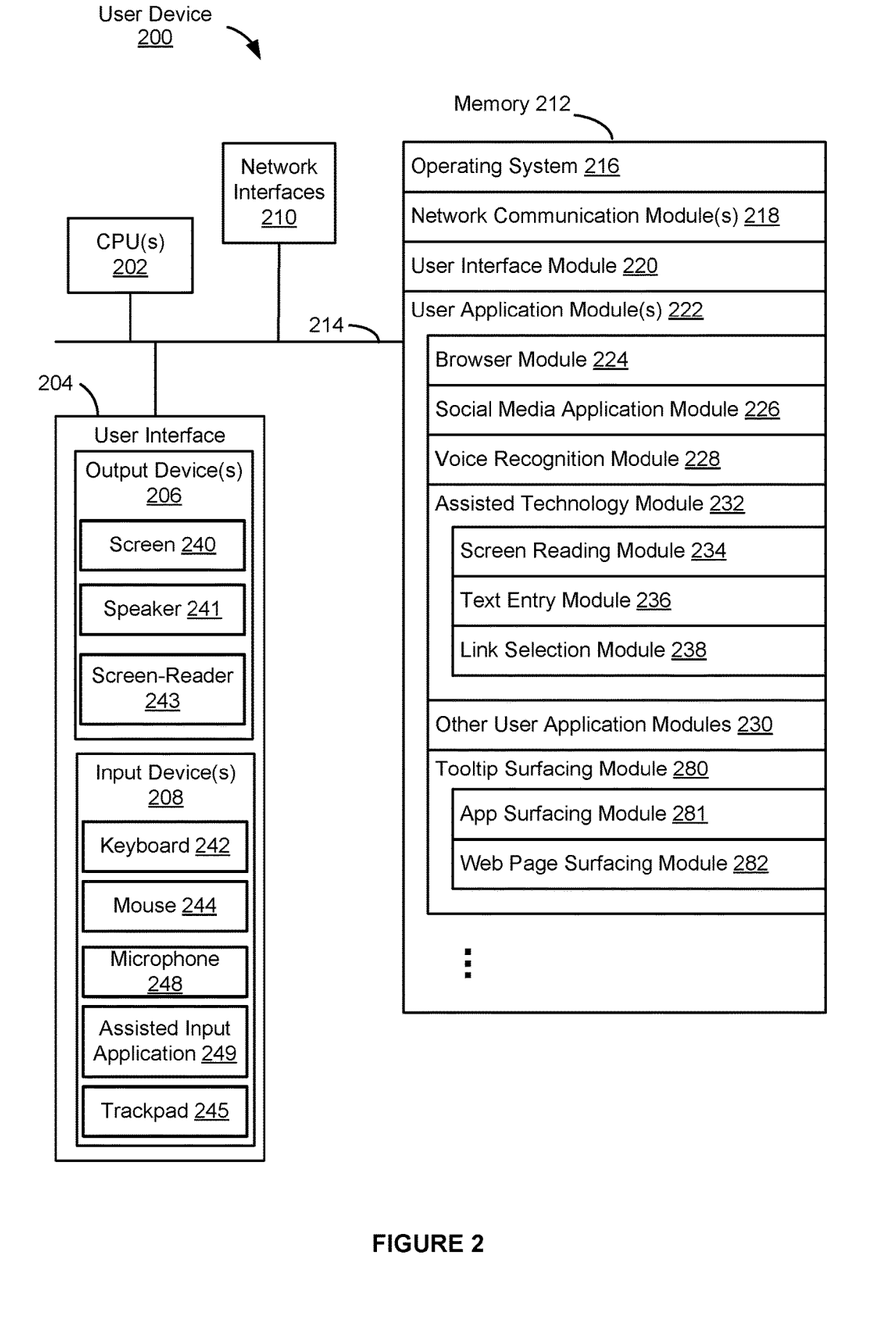
FIG. 2 is a block diagram illustrating an example user device in accordance with some embodiments.
Figure 3:
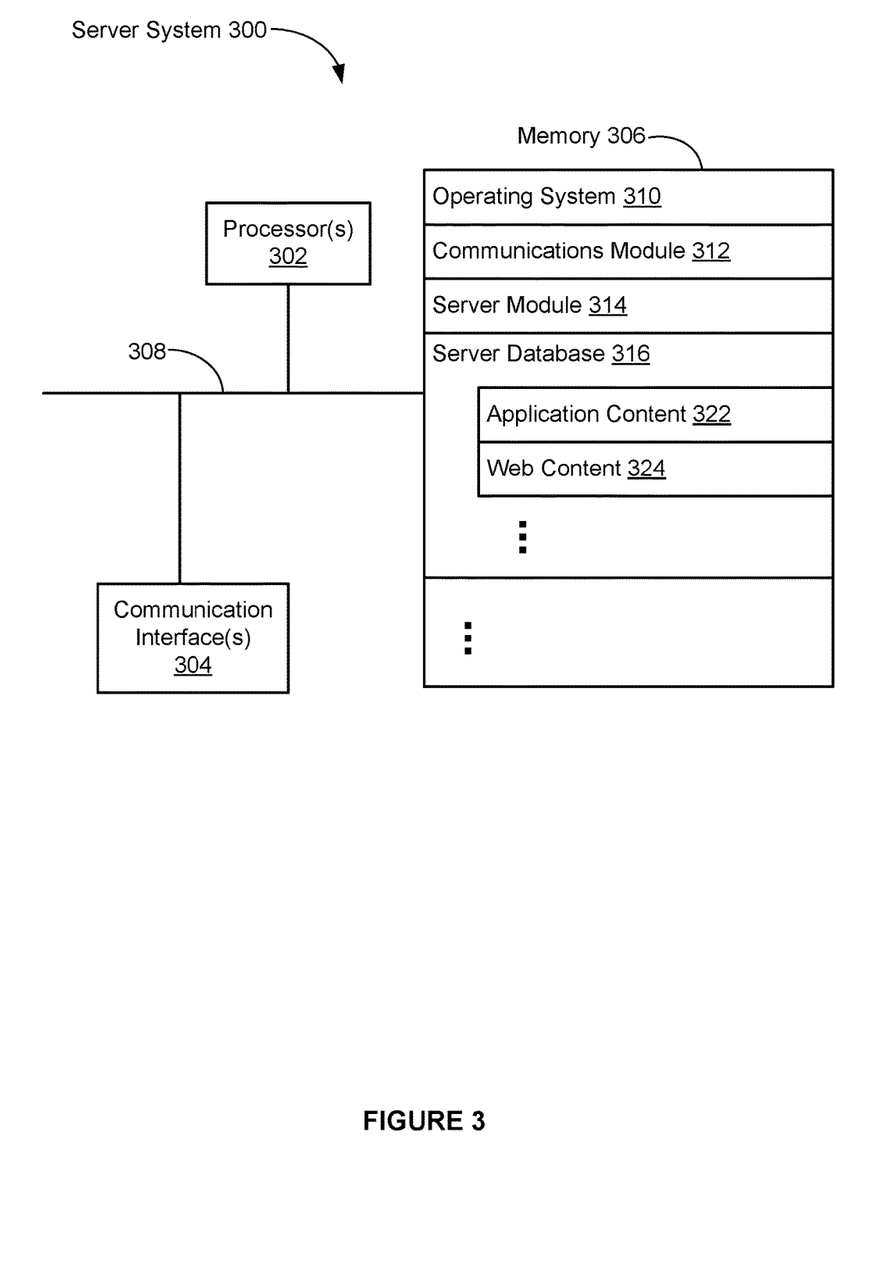
FIG. 3 is a block diagram illustrating an example server system in accordance with some embodiments.

User 102 employs user device 200 to execute functions, such as functions related to native applications running on the user device 200 (e.g., "apps"), and/or functions related to accessing web pages such as web content 324 of the server system 300 (FIG. 3). For example, a user 102 may interact with a social media application module 226 (FIG. 2) executing on user device 200 to access social media content, which may be stored locally or may be provided by application content 322 of server system 300. Or, a user 102 may interface with web content 324 (FIG. 3) using a web browser (e.g., browser module 224, FIG. 2) to access web content such as social media content.

In some embodiments, such as for native applications, functions may be executed entirely on the user device 200. In some such embodiments, the user device 200 may not be connected to a network 106 or may be disconnected from the network 106 temporarily when there is not a need to access content over network 106.

In some embodiments, the user device 200 may send a function request to a server system 300, which will perform the requested function, and the user device will display the result. For example, the request may be an HTTP request for the server system 300 to provide web content located at a web address (e.g., URL).

The user device 200 may access the server systems 300 through various means via network 106. For example, in some embodiments, a user device 200 executes a web browser application (e.g., browser module 224) that can be used to access a social media service hosted by the server system 300. As another example, in some embodiments, the user device 200 may execute a software application that is specific to a service or function (e.g., an "app" running on a smart phone, tablet, or other device), such as a social media service.

In some embodiments, the server system 300 stores and provides content (via the network(s) 106) to the users 102 via the user device 200. Content stored and served by the server system 300, in some implementations, includes lists of functions, user data, and content necessary to perform the functions. Content may also include web content such as web pages.

The description of the server system 300 as a "server" is intended as a functional description of the devices, systems, processors, and/or other components that provide the functionality attributed to the server system 300. It will be understood that the server system 300 may be a single server computer or multiple server computers. The server system 300 may be coupled to other servers and/or server systems, or other devices, such as other user devices, databases, content delivery networks (e.g., peer-to-peer networks), network caches, and the like. In some embodiments, the server 300 may communicate with other, unaffiliated, servers. In some implementations, the server system 300 is implemented by multiple computing devices working together to perform the actions of a server system (e.g., cloud computing). Furthermore, any functionalities performed by the server system 300 may also be performed additionally, alternatively, and/or concurrently by the one or more user devices 200. For example, some functions may be fully executable on a user device 200 without the need to communicate with a server 300.

User device 200 and the server system 300 may be communicably coupled in a variety of ways. In some implementations, multiple user devices 200 send requests to perform various functions to the server system 300 via a network 106. In response to receiving the requests, the server system 300 may return the requested information to the user device 200.

FIG. 2 is a block diagram illustrating an example user device 200 in accordance with some embodiments. The user device 200 may typically include one or more central processing units (CPU(s), e.g., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

The user device 200 typically includes a user interface 204, including output device(s) 206 and input device(s) 208. In some embodiments, output devices 206 comprise a screen 240, speaker 241, and/or screen-reader 243. In some embodiments, the speakers 241 may be headphones or earbuds external to the user device 200. Such headphones or earbuds may connect to user device 200 via a cord or may communicate with the user device 200 through a wireless protocol or network via a network interface 210. In other embodiments, speakers 241 may comprise internal "built-in" speakers in the user device 200. In some embodiments, user device 200 may have multiple speakers 241. Screen reader 243 may be a physical device or may be a software application. In some embodiments, screen reader 243 may comprise both a physical device and a software application. In some embodiments, screen reader 243 will generate output through speaker 241. In other embodiments, screen reader 243 may have its own output mechanism, such as its own speaker.

In some implementations, the input devices 208 include one or more of a keyboard 242, mouse 244, trackpad 245, or microphone 248. Alternatively, or in addition, the user interface 204 may include a display device that may include a touch-sensitive surface, in which case the screen 240 may comprise a touch-sensitive display (e.g., a "touchscreen"). In user devices that have a touch-sensitive display, a physical keyboard may be optional (e.g., a soft keyboard may be displayed when keyboard entry is needed). Furthermore, some user devices 200 may use a microphone 248 and/or an assisted input application 249 to supplement or replace the keyboard 242. In some embodiments, the microphone 248 may be a "built-in" condenser microphone located inside the user device 200. In some embodiments, microphone 248 may comprise an external microphone, connected to user device 200 via a cord or through a wireless protocol or network via a network interface 210. In some embodiments, user device 200 will contain multiple microphones 248.

The assisted input application 249 may comprise voice recognition software to receive audible input via a microphone 248. The assisted input application 249 may transcribe the received sounds (such as a spoken language) into text which is then input to user device 200 in a similar manner to text input through a keyboard 242. The assisted input application 249 may also accept commands to perform actions commonly performed by a mouse 244 or trackpad 245, such as moving a cursor or "clicking" on an object (or text). In this way, the user 102, who may be visually-impaired, may nevertheless interact with elements displayed on user device 200.

For example, an assisted input application 249 may receive a verbal command to "move cursor to <somewhere>" or to "click on <some link>" and will take the appropriate action(s), such as moving the cursor or "clicking" on the link. Assistive input application 249 may process commands such as "click" commands differently than mice 244 or trackpads 245. For example, while, generally, a mouse 244 can click only where a cursor is located, an assistive input application 249 may be capable of clicking elsewhere on or off of the display. For example, if a user 102 issued a command to "click on <some image>," assistive input application 249 may "click" on the specified image without moving the cursor to that image. Assisted input application 249 may be a physical device or may be a software application. In some embodiments, assisted input application 249 may comprise both a physical device and a software application. In some embodiments, assisted input application 249 will receive input from microphone 248. In other embodiments, assisted input application 249 may have its own input mechanism, such as its own microphone.

In some implementations, the one or more network interfaces 210 include wireless and/or wired interfaces for receiving data from and/or transmitting data to a server system 300 and/or other devices or systems. In some implementations, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some implementations, data communications are carried out using any of a variety of custom or standard wired protocols (e.g., USB, Firewire, Ethernet, etc.). For example, in some implementations, the one or more network interfaces 210 includes a wireless LAN (WLAN) interface for enabling data communications with the server system 300 (via the one or more network(s) 106, FIG. 1).

Memory 212 may include high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some implementations, memory 212 or the non-transitory computer-readable storage medium of memory 212 stores the following programs, modules, and data structures, or a subset or superset thereof:

an operating system 216 that includes procedures for handling various basic system services and for performing hardware-dependent tasks;

network communication module(s) 218 for connecting the user device 200 to other computing devices (e.g., server system 300) via the one or more network interface(s) 210 (wired or wireless) connected to one or more networks 106 (FIG. 1);

a user interface module 220 that receives commands and/or inputs from a user 102 via the user interface 204 (e.g., from input devices 208), and provides outputs for the user interface 204 (e.g., the output devices 206); and one or more user application modules 222, including the following modules (or sets of instructions), or a subset or superset thereof:

- a web browser module 224 (e.g., Internet Explorer or Edge by Microsoft, Firefox by Mozilla, Safari by Apple, or Chrome by Google) for accessing, viewing, and interacting with web sites (e.g., a social-networking web site provided by the server system 300),
- a social media application module 226 for allowing a user 102 to access a social media system;
- a voice recognition module 228, to receive and parse spoken language;
- assisted technology module(s) 232 for performing tasks related to providing assisted access to computer input and output functions, including but not limited to:
  - a screen-reading module 234 for converting content on a screen 240 into audible/spoken word, in some embodiments to be provided to screen-reader 243;
  - a text entry module 236 for accepting verbal entry of text; and
  - a link selection module 238 for accepting verbal commands to select or "click" on a link, such as links from browser module 224 or social media application module 226;
- tooltip surfacing module(s) 280 for detecting informational messages (e.g., tooltips) associated with elements of a displayed screen, and reconfiguring the displayed screen for screen-reading module 234, the module 280 including but not limited to:
  - an application ("app") surfacing module 281 for reconfiguring a screen displayed by an application (e.g., social media application module 226 or an optional user device application module 230); and
  - a web page surfacing module 282 for reconfiguring a web page displayed by a web browser (e.g., by web browser module 224);
- other optional user device application module(s) 230, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D gaming, virtual reality, electronic book reader, and/or workout support.

The voice recognition module 228 monitors waveforms, such as those from sound, to detect spoken language. In some embodiments, voice recognition module 228 will convert the spoken language into text (such as text to be input by text entry module 236) or commands (such as commands to direct assisted application 249). In some embodiments, such commands may include a command to "click" on a link using link selection module 238. In some embodiments, voice recognition module 228 may be a part of assisted input application 249. In some embodiments, it may be a part of an assisted technology module 232. In some embodiments, it may be a component of a screen reader 243, such as JAWS, Dolphin, or NVDA. In some embodiments, it may comprise a stand-alone commercial application, such as Dragon Naturally Speaking.

Assisted technology module 232 provides features useful to a user 102 with a disability such as sight impairment. In some embodiments, assisted technology module 232 includes a screen-reading module 234 that reads text displayed on a screen 240. In some embodiments, screen-reading module 234 may be a component of a commercial (or open-source) disability program such as JAWS, Dolphin, or NVDA. In some embodiments, it may be a function of or be associated with a physical device, such as a screen reader 243. In some embodiments, assisted technology module 232 includes a text entry module 236. Text entry module 236 allows for the entry of text from an assisted input application 249. In some embodiments, text entry module 236 may be a part of a physical assisted input application 249. In some embodiments, text entry module 236 may comprise (or be a component of) a voice recognition module 228, such as Dragon NaturallySpeaking. In some embodiments, assisted technology module 232 may comprise a link selection module 238, which allows the selection of a "link" on a web browser module 224 or social media application module 226.

Tooltip surfacing module 280 may detect the usage of a screen reader (e.g., screen-reading module 234) for reading content displayed on a screen 240. For example, when the user 102 interacts with a user application module 230 or social media application module 226 running on user device 200, the tooltip surfacing module 280 may detect that the screen-reading module 234 will be used to read aloud the displayed screen to the user. As another example, when the user 102 uses browser module 224 to access a web page (e.g., a web page that is part of web content 324 in server system 300), the tooltip surfacing module 280 may detect that the screen-reading module 234 will be used to read aloud the web page. However, embodiments are not limited thereto, and in some examples, the tooltip surfacing module 280 may not attempt to detect usage of a screen reader prior to employing app surfacing module 281 or web page surfacing module 282 to manipulate tooltips for the visually-impaired user.

In an example where the screen-reading module 234 is to read aloud a web page, the tooltip surfacing module 280 may use web page surfacing module 282 to reorganize the HTML content of the web page prior to it being read aloud, as will be described in more detail below. In an example where the screen-reading module 234 is to read aloud a screen displayed by an app, the tooltip surfacing module 280 may employ use of app surfacing module 281 to focus certain elements while defocusing others. Examples of details of the operations of tooltip surfacing module 280, including app surfacing module 281 and web page surfacing module 282, will be described below with reference to FIGS. 5 and 6.

While tooltip surfacing module 280, including app surfacing module 281 and web page surfacing module 282, is described herein as a separate user application module 222, this concept is provided merely for ease of discussion, and embodiments are not limited thereto. For example, in some embodiments, the instructions of tooltip surfacing module 280 and app surfacing module 281 may be integrated as part of an app module such as social media application module 226 or other user application modules 230. Furthermore, in some embodiments, the instructions of tooltip surfacing module 280 and web page surfacing module 282 may be installed as a plugin or otherwise integrated with a web browser such as browser module 224. Alternatively and/or additionally, the instructions of tooltip surfacing module 280 may be integrated as part of screen-reading module 234.

Although FIG. 2 illustrates user device 200 in accordance with some implementations, FIG. 2 is intended more as a functional description of the various features that may be present in one or more user devices 200 than as a structural schematic of the implementations described herein. In practice, items shown separately could be combined and some items could be separated. For example, some items shown separately in FIG. 2 could be implemented in single applications and single items could be implemented by one or more applications. The actual number of applications used to implement the user device 200, and how features are allocated among them, will vary from one implementation to another.

Similarly, some hardware items shown separately could be combined and some items could be split into multiple hardware items. For example, assisted input application 249 may contain its own sound sampling device, or may use microphone 248. For another example, screen reader 243, if implemented as a physical device, may have its own microphone and/or sound generating equipment, or may use one or more microphones 248 and/or speakers 241 of user device 200. Further, some components could be implemented as hardware, as software, or as a combination of hardware and software. For example, assisted input application 249 may be a physical device or may be a software application. For another example, screen reader 243 may be implemented as a physical hardware device or as a software application, such as screen-reading module 234, or as a combination of hardware and software.

FIG. 3 is a block diagram illustrating an example server system 300 in accordance with some implementations. The server system 300 typically includes one or more central processing units/cores (CPUs) 302, one or more network interfaces 304, memory 306, and one or more communication buses 308 for interconnecting these components.

Memory 306 may include high-speed random access memory, such as DRAM, SRAM, DDR RAM, or other random access solid-state memory devices, and may include non-volatile memory, such as one or more magnetic disk storage devices, optical disk storage devices, flash memory devices, or other non-volatile solid-state storage devices. Memory 306, optionally, includes one or more storage devices remotely located from one or more CPUs 302. Memory 306, or, alternatively, the non-volatile solid-state memory device(s) within memory 306, includes a non-transitory computer-readable storage medium. In some implementations, memory 306, or the non-transitory computer-readable storage medium of memory 306, stores the following programs, modules, and data structures, or a subset or superset thereof:

an operating system 310 that includes procedures for handling various basic system services and for performing hardware-dependent tasks;

a network communication module 312 that is used for connecting the server system 300 to other computing devices (e.g., user device 200 (FIG. 2) or other server systems 300) via one or more network interfaces 304 (wired or wireless) connected to one or more networks 106 (FIG. 1);

a server module 314 for enabling the server system 300 to perform various functions, including providing web pages of web content 324 to a user device 200 or another server 300, and providing content 322 to applications executed on a user device 200 or another server 300;

a server database 316 for handling the storage of and access to content to be provided to a user device 200 or another server 300, the server data module 320 including but not limited to:

application content 322, for storing data to be provided to applications executed on a user device 200, such as social media application module 226 or other user application modules 230 (FIG. 2);

web content 324, for storing web pages, including, but not limited to pages served by server module 314;

In some implementations, the server module 314 and server database 316 of server system 300 include web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Python, Extensible Markup Language (XML), Java, JavaScript, Asynchronous JavaScript and XML (AJAX), XHP, Javelin, Wireless Universal Resource File (WURFL), and the like.

In some implementations, application content 322 of server system 300 includes data and other content that may be provided to a native application running on a user device 200 (e.g., to social media application module 226 or a user application module 230, FIG. 2).

Although FIG. 3 illustrates the server system 300 in accordance with some implementations, FIG. 3 is intended more as a functional description of the various features that may be present in one or more server systems than as a structural schematic of the implementations described herein. In practice, items shown separately could be combined and some items could be separated. For example, some items shown separately in FIG. 3 could be implemented on single servers and single items could be implemented by one or more servers. The actual number of servers used to implement the server system 300, and how features are allocated among them, will vary from one implementation to another and, optionally, depends in part on the amount of data traffic that the server system handles during peak usage periods as well as during average usage periods.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 212 and 306 optionally store a subset or superset of the respective modules and data structures identified above. Furthermore, memory 212 and 306 optionally store additional modules and data structures not described above.

Figure 4:
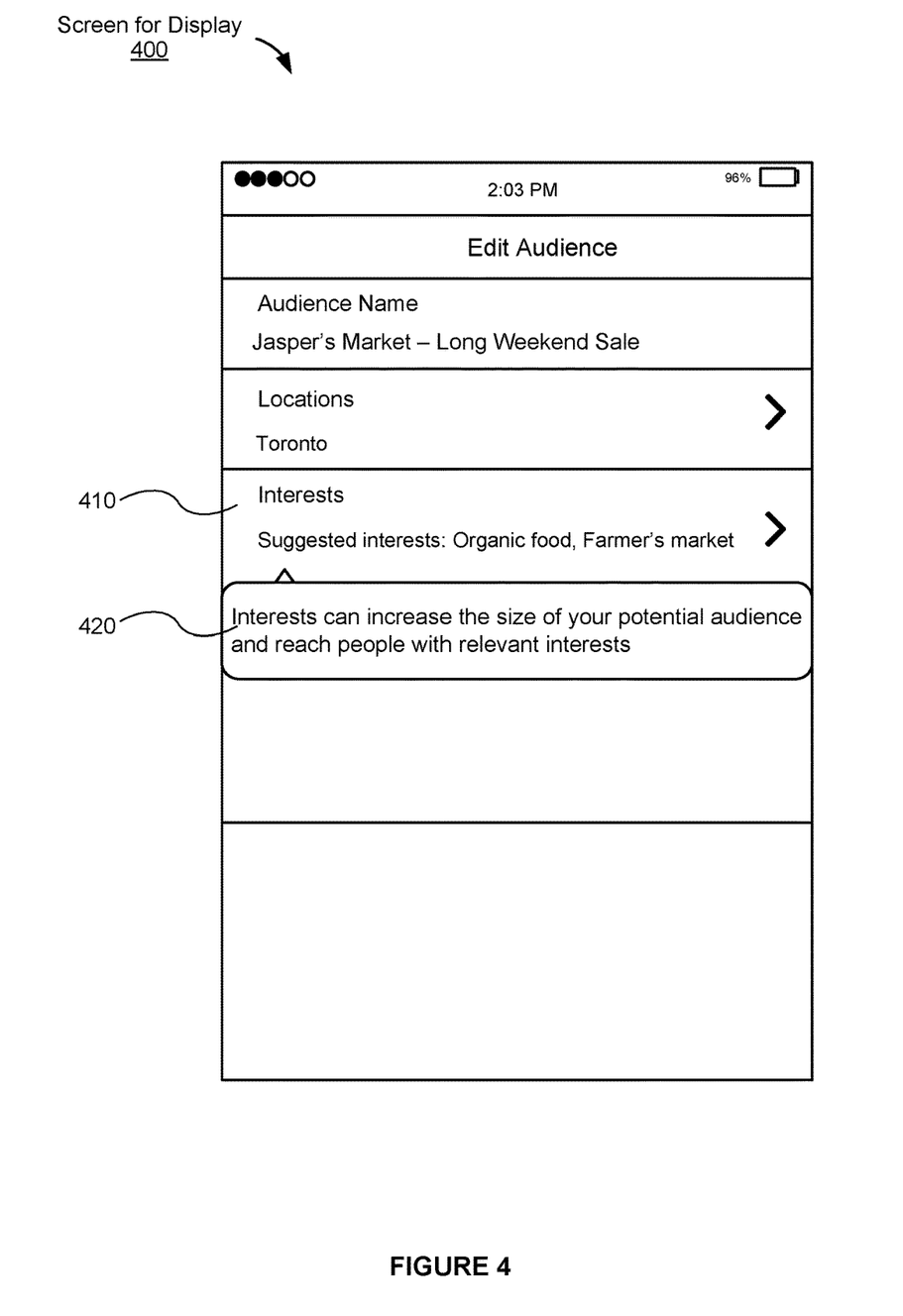
FIG. 4 illustrates an example screen for display by a user device in accordance with some embodiments.

FIG. 4 is an example of a screen for display 400 on a user device 200. The screen may be caused to be displayed by an application running on the user device 200 (e.g., social media application module 226 or other user application module 230, FIG. 2), or may be a display of a web page provided by the web content 324 (FIG. 3) of server system 300 via a web browser (e.g., browser module 224, FIG. 2). FIG. 4 shows, on the example screen for display 400, an example user interface element 410, which may be selectable or otherwise interactive for the user 102. FIG. 4 also shows an example informational message 420 (which may be termed a tooltip), which provides information about the user interface element 410. For example, informational messages may provide additional detail on a user interface element, including reasons for its selection, actions it might cause, etc. In some example screens, there may be multiple informational messages 420, each respectively associated with one of multiple user interface elements 410. As discussed above, the screen-reading module 234 of user device 200 may, by default, read the informational message 420 at a time that causes confusion for the visually-impaired user.

Figure 5:
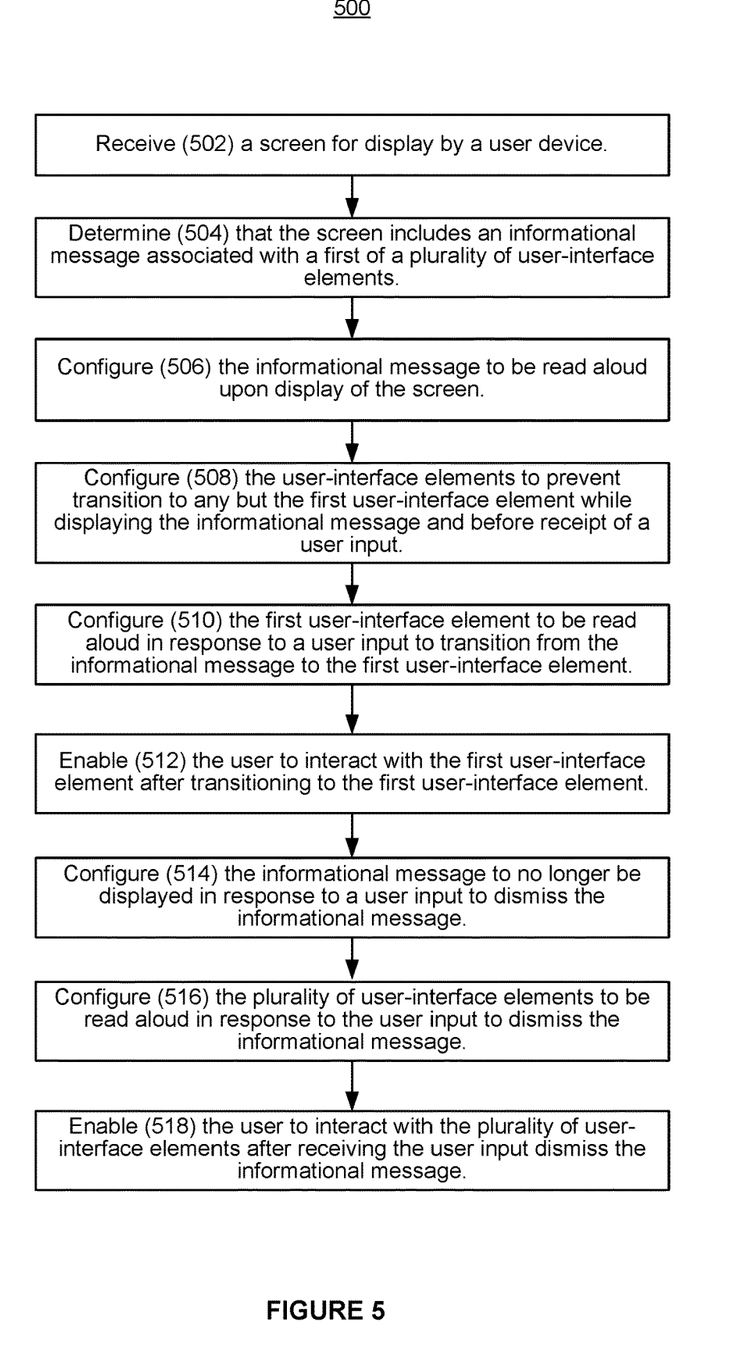
FIG. 5 illustrates a flow diagram of an example method for tooltip surfacing with a screen reader in accordance with some embodiments.

FIG. 5 is a flow diagram illustrating an example method 500 for tooltip surfacing with a screen reader in accordance with some embodiments.

The steps of the method 500 may be performed by any combination of one or more user devices 200 (FIGS. 1 and 2) and/or server system 300 (FIGS. 1 and 3). The method 500 corresponds to instructions stored in computer memory (e.g., memory 212 of the user device 200), and may be included as part of tooltip surfacing module 280 (FIG. 2). In some embodiments, the steps of the method 500 are performed entirely on one user device 200.

In an example where the screen-reading module 234 is employed to read a screen to be displayed to a visually-impaired user (e.g., screen for display 400 of FIG. 4), the tooltip surfacing module may function to receive (502) the screen for display by the user device 200. In some embodiments, the use of the screen-reading module 234 may be detected or otherwise known by the tooltip surfacing module 280, while in other embodiments, the tooltip surfacing module 280 may presume that a screen-reading module 234 is enabled.

In some embodiments, the tooltip surfacing module 280 may receive a screen for display from an application running on user device 200 (e.g., social media application module 226 or other user application module 230). In other embodiments, the tooltip surfacing module 280 may receive a screen for display in the form of a web page (e.g., as provided to browser module 224 from web content 324 of server system 300).

The tooltip surfacing module 280 may determine (504) that the screen for display includes an informational message (e.g., a tooltip) associated with a first of a plurality of user-interface elements. In an example where the screen for display (e.g., 400) is provided in the form of a web page, the tooltip surfacing module 280 (e.g., the web page surfacing module 282) may examine the web page code (including HTML elements) to detect the existence of tooltips, which may be provided in the form of a title or alt attribute of an HTML element.

For example, in the example screen for display 400 shown in FIG. 4, the HTML element code for user interface element 410 may include the attribute title="Interests can increase the size of your potential audience and reach people with relevant interests"

By detecting the existence of the title attribute in HTML element(s) of a web page, the web page surfacing module 282 may determine that the screen for display includes an informational message (e.g., a tooltip) associated with that HTML element.

In an example where the screen for display 400 is provided by an application running on user device 200 (e.g., social media application module 226 or other user application module 230), the tooltip surfacing module 280 (e.g., the app surfacing module 281) may detect the presence of tooltips within the screen provided by the native application (e.g., an android application), as may be known to one of skill in the art.

Embodiments described herein are not limited to examples including only one tooltip, and the example method 500 may be applied to a web page or application screen containing multiple tooltips each respectively associated with one of multiple user-interface elements.

In some embodiments, after determining (504) that the screen for display includes an informational message associated with a user-interface element, the tooltip surfacing module 280 may configure (506) the informational message to be read aloud upon display of the screen. For example, the informational message may be read aloud prior to reading aloud any elements or other text of the screen. In another example, the informational message may be read aloud at a time corresponding to (e.g., determined by) the location on the screen of the user-interface element with which it is associated.

In an example where the screen for display is provided in the form of a web page, the tooltip surfacing module 280 (e.g., the web page surfacing module 282) may modify the tabindex value of the HTML element with which the informational message is associated (e.g., to which it points). For example, in an embodiment where it is desired to read aloud the tooltip prior to the time when it would be read based on its location on the screen, the tabindex value of the HTML element(s) that include title attributes may be set to a value(s) (e.g., for multiple such HTML elements, sequential values) such that the HTML element(s) is treated first by the screen reader (e.g., it is "focusable"). In an embodiment where it is desired to read the tooltip at a time corresponding to at its location on the screen, the web page surfacing module 282 may edit the tabindex values of some or all HTML elements in the web page to force the order in which the elements and tooltip are read. Alternatively and/or additionally, the tabindex value of all HTML elements that do not have tooltips associated therewith is set to −1, indicating that such elements may not be reached through sequential navigation. In either case, the title attribute (e.g., the tooltip) may be arranged immediately next to the HTML element to ensure that it is read immediately prior to reading the HTML element.

In an implementation where the screen for display is provided by an application, the tooltip surfacing module 280 (e.g., the app surfacing module 281) may focus on the tooltip. Then, the screen reader may read aloud the tooltip.

In some embodiments, the user-interface elements on the screen may be configured (508) to prevent transition to any element but the first user-interface element (i.e., the first element with which an informational message is associated) while the informational message is being displayed and before the app surfacing module 282 has received an input from the user 102. For example, in implementations in which the screen for display is provided in the form of a web page, the tooltip surfacing module 280 (e.g., the web page surfacing module 282) may set the tabindex value to −1 for all HTML elements other than the HTML element with which the informational message is associated, meaning that such HTML elements may not be reached through sequential navigation, as discussed above with reference to step 506.

In an implementation where the screen for display is provided by an application, the tooltip surfacing module 280 (e.g., the app surfacing module 281) may disable the focusability of all elements other than the first user-interface element. Meanwhile, the first user-interface element may be brought into focus. Disabling the focusability of user-interface elements, such that they are de-focused, prevents the screen reader from being able to read them.

In some embodiments, the first user-interface element may be configured (510) to be read aloud (e.g., by screen-reading module 234) in response to a user's input to transition from the informational message to the first user-interface element.

For example, in implementations in which the screen for display is provided in the form of a web page, the transition to the HTML element (i.e., the first user-interface element) with which the informational message is associated may be a progression from the informational message due to the setting of the tabindex value for the HTML element, the setting of the tabindex value to −1 for all other HTML elements, and/or the placement of the tooltip attribute immediately prior to the HTML element with which it associates. Thus, when the user 102 provides an input to transition from the informational message, the next element provided to the screen reader may be the HTML element. This input may be received by voice command (e.g., via voice recognition module 228), "swiping" the display screen, or any other manner of acceptable user input as may be known in the art and as may be provided for by user interface 204 of user device 200.

In an implementation where the screen for display is provided by an application, the screen reader may read aloud the first user-interface element as a result of the focusing of the first user-interface element and de-focusing of the other user-interface elements, as described above for step 508.

In some embodiments, the user 102 may be enabled (512) to interact with the first user-interface element after transitioning to the first user-interface element. For example, in an implementation where the screen for display is provided in the form of a web page, the setting of the tabindex value(s) described above in step 510 may provide for browser module 224 to allow the user to interact with (e.g., select, click, enter text, etc.) the HTML element associated with the informational message.

In an implementation where the screen for display is provided by an application, the user 102 may be able to interact with the first user-interface element after transitioning to this element according to the normal operation of the application.

In some embodiments, the informational message may be configured (514) to no longer be displayed in response to a user input to dismiss the informational message. For example, in an implementation where the screen for display is provided in the form of a web page, the user 102 may provide an input to the user device 200 that indicates a desire to dismiss the informational message (and, in some embodiments, the HTML element associated therewith). This indication may be received by voice command (e.g., via voice recognition module 228), "swiping" the display screen, or any other manner of acceptable user input as may be known in the art and as may be provided for by user interface 204 of user device 200. As a result of the input, the screen reader may transition to the next sequential element according to the tabindex values.

In an implementation where the screen for display is provided by an application, the tooltip surfacing module 280 (e.g., the app surfacing module 281) may instruct the application to no longer display the informational message in response to the user input to dismiss the message.

In some embodiments, the plurality of user-interface elements may be configured (516) to be read aloud by the screen reader in response to the user input to dismiss the informational message. For example, in an implementation where the screen for display is provided in the form of a web page, the tooltip surfacing module 280 (e.g., the web page surfacing module 282) may modify the tabindex values of the other elements (e.g., HTML elements) from −1 to be sequential or to default to their original values. This may include the HTML element with which the informational message is associated, or it may not. By appropriately assigning tabindex values to the HTML elements, or by restoring or leaving intact their tabindex values, the screen-reading module 234 may proceed to read aloud the plurality of HTML elements in their intended order after the informational message has been dismissed.

In an example where the informational message was read aloud prior to reading aloud the other elements of the screen, the elements may be configured such that the screen-reading module 234 proceeds to read from the first of the elements as visually arranged on the screen for display. In an example where the informational message was read aloud at a time corresponding to (e.g., determined by) its location on the screen, the elements may be configured such that the screen-reading module 234 proceeds to read aloud the elements starting at the element immediately following the first user-interface element associated with the informational message and proceeding in a specified order (e.g., left to right, top to bottom).

In an implementation where the screen for display is provided by an application, the tooltip surfacing module 280 (e.g., the app surfacing module 281) may re-enable the focusability of the remainder of the elements such that the screen reader may proceed to read them aloud.

In some embodiments, the user 102 may be enabled (518) to interact with the plurality of user-interface elements after the user device 200 receives the user's input to dismiss the informational message. For example, in an implementation where the screen for display is provided in the form of a web page, the setting of the tabindex value(s) described above in step 516 may provide for browser module 224 to allow the user to interact (e.g., select, click, enter text, etc.) with the HTML elements after the user 102 has dismissed the informational message.

In an implementation where the screen for display is provided by an application, the user 102 may be able to proceed to interact with any of the elements once their focusability has been re-enabled, as described above for step 516.

While the above methods have been generally described with reference to a singular informational message and first user-interface element associated therewith, embodiments are not limited thereto. For example, a web page may include multiple informational messages (e.g., tooltips) associated with multiple respective HTML elements. In such an example, tooltip surfacing module 280 may configure the multiple elements and informational messages in a manner according to the above. For example, the tooltip surfacing module 280 may sequentially progress through the informational messages and elements associated therewith until the user 102 has either dismissed all of the informational messages or chosen to interact with one of the elements associated with an informational message, in which case the screen-reading module 234 may thereafter proceed according to its normal operation.

Furthermore, the technical implementations of the method 500 discussed above are provided merely as examples, and modifications of these implementations, as well as additional implementations, will be apparent to those of skill in the art in view of the present disclosure.

Figure 6:
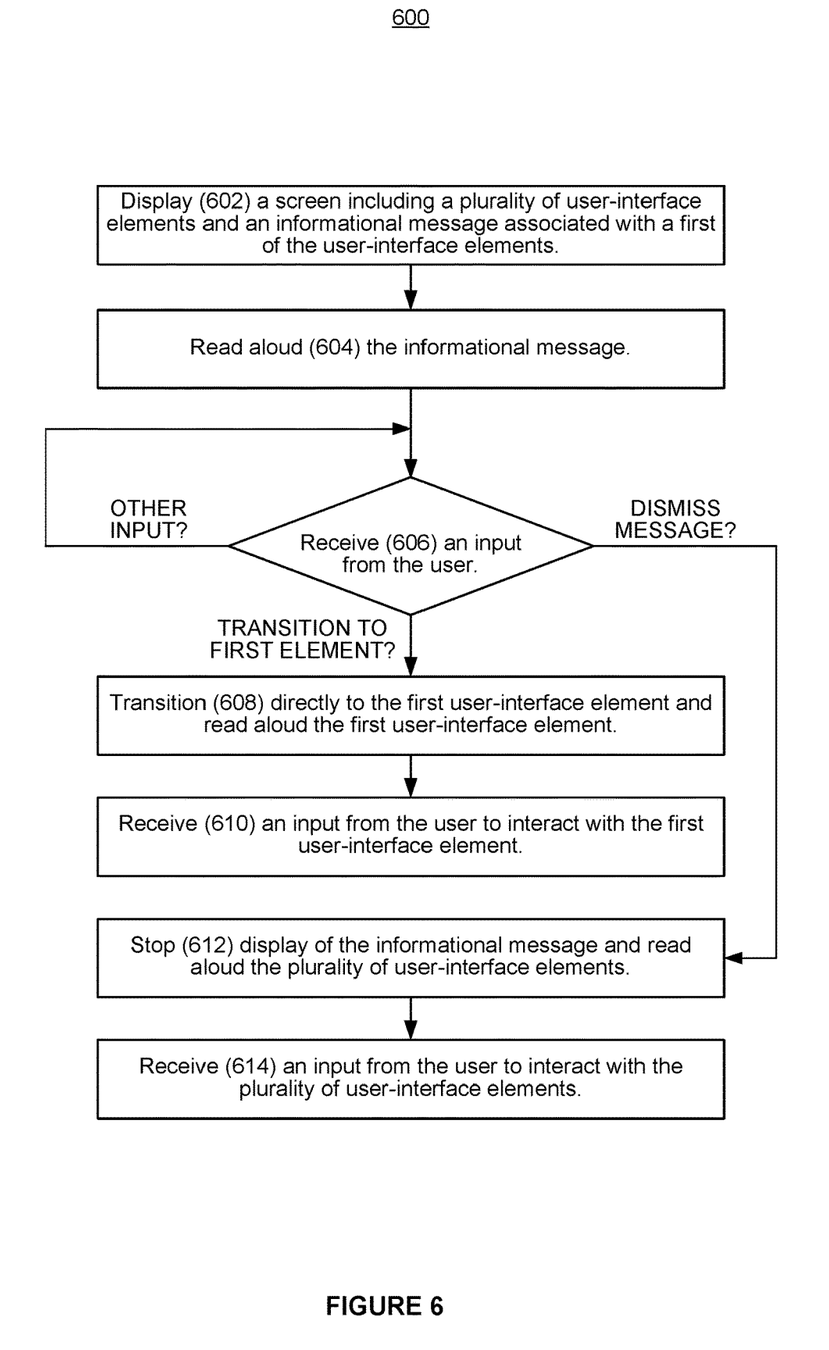
FIG. 6 illustrates a flow diagram of an example screen-reading method in accordance with some embodiments.

FIG. 6 illustrates an example screen-reading method 600 performed on the user device 200 as a result of the configuration of FIG. 5, in accordance with some embodiments.

In the method 600, according to the execution of a process as described by example with reference to FIG. 5, a user device 200 may display (602) a screen including a plurality of user-interface elements. The screen may include an informational message (e.g., a tooltip) associated with a first of the user-interface elements. Furthermore, the screen may include multiple informational messages each associated with a respective user-interface element.

The user device 200 may read aloud (604) the informational message. Then, the user device 200 may await receipt (606) of an input from the user 102. In some embodiments, the user 102's input may indicate either to transition to the first user-interface element or to dismiss the informational message. Any other type of input may be ignored and the user device 200 may await receipt of one of these two valid inputs. In some examples, the user device 200 may repeat the reading aloud of the informational message when it receives an invalid input.

If the user input indicates to transition to the first user-interface element, the user device 200 may do so, transitioning (608) directly to the first user-interface element and reading it aloud. Then, in an example embodiment, the user device 200 may await receipt (610) of an input from the user 102 to interact with the first user-interface element. Alternatively, the user 102 may choose to dismiss the first user-interface element, in which case, the user device 200 may proceed with the next informational message and user-interface element (if they exist), or, alternatively, proceed with a normal reading of the screen.

If the user input indicates to dismiss the informational message, the user device 200 may do so, stopping (612) display of the informational message and proceeding to read aloud the plurality of user-interface elements. Then, in some embodiments, the user device 200 may await receipt (614) of an input from the user 102 to interact with the plurality of user-interface element according to a normal operation. Alternatively, the user device 200 may first proceed with the reading of the next informational message and user-interface element (if they exist), until all have been dismissed or there has been an interaction with one of the elements, after which the screen-reading module 229 may proceed according to its normal operation.

Although some of various drawings illustrate a number of logical stages in a particular order, stages which are not order dependent may be reordered and other stages may be combined or broken out. Furthermore, in some implementations, some stages may be performed in parallel and/or simultaneously with other stages. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, comprising:
at a user device having one or more processors and memory storing instructions for execution by the one or more processors:
configuring an informational message associated with a first user-interface element of a plurality of user-interface elements on a screen displayed by the user device to be read aloud by a screen reader upon display of the screen; and
configuring the first user-interface element to be read aloud by the screen reader in response to a user input to transition the screen reader from the informational message to the first user-interface element.

2. The method of claim 1, wherein the informational message and the first user-interface element are configured to transition the screen reader directly from the informational message to the first user-interface element after receiving the user input.

3. The method of claim 2, wherein the screen displayed by the user device comprises:
the informational message and the first user-interface element at different positions on the screen; and
one or more other user-interface elements interposed between the informational message and the first user-interface element.

4. The method of claim 3, wherein the one or more other user-interface elements interposed between the informational message and the first user-interface element comprise text interposed between the informational message and the first user-interface element.

5. The method of claim 2, further comprising, at the user device:
enabling interaction with the first user-interface element by the user after the screen reader transitions to the first user-interface element.

6. The method of claim 1, wherein the screen displayed by the user device includes a tooltip, which includes the informational message and points to the first user-interface element.

7. The method of claim 6, wherein the informational message indicates a feature of the first user-interface element.

8. The method of claim 7, wherein the feature is an action to be taken when the first user-interface element is selected.

9. The method of claim 1, further comprising, at the user device:
configuring the informational message to no longer be displayed in response to a user input to dismiss the informational message after the user device reads aloud the information message.

10. The method of claim 9, further comprising, at the user device:
configuring the user-interface elements to be read aloud at times corresponding to their respective visual locations on the screen, using the screen reader, in response to the user input to dismiss the informational message.

11. The method of claim 10, wherein the user-interface elements are configured to be read aloud at times corresponding to their respective visual locations on the screen in a left-to-right, top-to-bottom order.

12. The method of claim 9, further comprising, at the user device:
configuring the plurality of user-interface elements to prevent the screen reader from transitioning to any of the plurality of user-interface elements other than the first user-interface element while displaying the informational message and before receiving the user input to dismiss or the user input to transition.

13. The method of claim 1, wherein the informational message is configured to be read aloud at a time determined by a visual location of the informational message on the screen.

14. The method of claim 1, wherein the informational message is configured to be read aloud before reading aloud the plurality of user-interface elements and at a time before a time determined by a visual location of the informational message on the screen.

15. The method of claim 1, further comprising, at the user device:
configuring the plurality of user-interface elements such that after reading aloud the first user-interface element, each of the plurality of user-interface elements, other than the first user-interface element is read aloud at a respective time corresponding to a respective visual location of the respective user-interface element on the screen, using the screen reader.

16. The method of claim 1, wherein:
the screen is of a webpage; and
configuring the first user-interface element to be read aloud by the screen reader in response to the user input to transition comprises indexing the informational message immediately before the first user-interface element in the webpage.

17. The method of claim 1, wherein:
the screen is of an application running on the user device; and
configuring the first user-interface element to be read aloud by the screen reader in response to the user input to transition comprises, before receiving the user input to transition:
configuring the first user-interface element to be brought into focus; and
configuring the plurality of user-interface elements other than the first user-interface element to be brought out of focus;
wherein the screen reader can transition to a user-interface element that is in focus and cannot transition to a user-interface element that is out of focus.

18. The method of claim 17, further comprising, at the user device:
configuring the plurality of user-interface elements other than the first user-interface element to be brought into focus when the informational message is dismissed.

19. A non-transitory computer-readable storage medium storing one or more programs for execution by one or more processors of an electronic device, the one or more programs including instructions for:
configuring an informational message associated with a first user-interface element of a plurality of user-interface elements on a screen displayed by the electronic device to be read aloud by a screen reader upon display of the screen; and
configuring the first user-interface element to be read aloud by the screen reader in response to a user input to transition the screen reader from the informational message to the first user-interface element.

* * * * *